Oct. 3, 1961    N. F. MARZOLF    3,002,620
EGG GRADER

Filed Nov. 7, 1957    6 Sheets-Sheet 5

United States Patent Office 3,002,620
Patented Oct. 3, 1961

3,002,620
EGG GRADER
Norbert F. Marzolf, Strykersville, N.Y., assignor, by mesne assignments, to Marzolf Manufacturing Co., Inc., Strykersville, N.Y., a corporation of New York
Filed Nov. 7, 1957, Ser. No. 695,041
14 Claims. (Cl. 209—121)

This invention relates to the art of grading articles by weight, and more particularly to a new and useful mechanism for grading eggs.

It is a particular object of my invention to provide a machine which will grade a large number of eggs extremely rapidly, gently and with a very high degree of accuracy.

In one aspect thereof, an egg grading mechanism constructed in accord with my invention is characterized by the provision of a transfer mechanism, for moving eggs from the point at which they are fed to the machine to a feed member controlling the admission of eggs to a main conveyor, comprising a series of generally U-shaped links, the opposite ends of each link being pivotally connected to the adjacent link at the juncture between the legs and bight portion thereof thereby to comprise an endless chain, and means mounting the chain for moving its conveying flight over a friction producing surface, the bight portion of each link being generally V-shaped, whereby as eggs are fed into the machine they are picked up by the chain and moved thereby over the friction producing surface to the feed member, the V-shaped bight portions cradling the egggs and cooperating with the friction surface to aline the eggs with their major axis transverse to the direction of movement of the transfer mechanism.

In another aspect thereof, an egg grading mechanism constructed in accord with my invention is characterized by the provision of feed track means alined with the transfer mechanism to receive eggs therefrom and direct them to a main conveyor mechanism, and feed control means including a gate positioned for reciprocating, normally generally vertical movement into and out of a position blocking passage of the eggs from the feed track onto the main conveyor, together with bumper means pivotally mounted for movement with the gate into and out of a position to act as a barrier preventing movement of succeeding eggs along the feed track when the gate moves out of its blocking position to permit the first egg on the track to move therefrom onto the main conveyor, the bumper means having a lost motion connection with the gate for movement relative thereto whenever an egg is so positioned on the track as to preclude normal operation of the bumper means.

In another aspect thereof, an egg grading mechanism constructed in accord with my invention is characterized by the provision of a main conveyor mounted for reciprocating movement in operative alinement with a series of weighing scale pans, for depositing eggs thereon and picking up eggs therefrom and transferring them to succeeding scale pans, the main conveyor comprising a carriage having first and second parts arranged for movement in unison, the first part being adapted to support the second part, and the second part being adapted to carry the eggs and being further adapted for movement relative to the first part between an elevated position and a lowered position relative to the scale pans, means for moving the first and second parts as a unit throughout the carriage delivery stroke and then, at the beginning and end of the carriage return stroke, to alternately lower and elevate the second part relative to the first part and to the scale pans.

In still another aspect thereof, an egg grading mechanism constructed in accord with my invention is characterized by the provision of a weighing scale having a pan for receiving an egg, means normally biasing the pan to a first position, the pan being movable from its first position to a second position when an egg of sufficient weight is placed thereon, an egg displacing member operatively connected to the scale pan for movement therewith from its first position to its second position, egg receiving means positioned adjacent the scale pan, means for conveying an egg to the pan and for removing an underweight egg from the pan, an actuating member mounted for movement in a predetermined path, the egg displacing member being out of the path of movement of the actuating member when the scale pan is in its first position and projecting into said path for being actuated to displace an egg from the scale pan when the latter is in its second position, and means for reciprocating the actuating member in synchronism with movement of the conveying means.

In yet another aspect thereof, an egg grading mechanism constructed in accord with my invention is characterized by the provision of a weighing scale having an egg receiving platform, egg receiving means positioned adjacent the scale platform for receiving an egg displaced therefrom, means for conveying an egg to the platform and for removing an underweight egg therefrom, displacing means automatically operable to displace an egg of sufficient weight from the platform, and means including a clearing bar for moving displaced eggs along the receiving means away from the platform and out of the way of succeeding eggs being displaced therefrom, together with means synchronized with the conveying means and the displacing means for actuating the clearing bar to move it from an inactive position closely adjacent the scale platform and the article egg receiving means, enabling passage of a displaced egg thereover, away from the platform over the egg receiving means for moving displaced eggs therealong.

The foregoing and other objects, advantages and characterizing features of an egg grading mechanism constructed in accord with my invention will become clearly apparent from the ensuing detailed description of a presently preferred embodiment thereof, including alternate constructions of the main conveyor mechanism, in conjunction with the accompanying drawings illustrating the same wherein like reference numerals denote like parts throughout the various views and wherein:

It is to be understood that while I herein make specific reference only to eggs, that being the article to which the disclosed embodiment of my invention is particularly directed, I do not thereby intend to limit myself to a mechanism for grading only eggs. On the contrary, I am aware that the grading mechanism of my invention is readily suited to and adapted for the grading of numerous articles other than eggs.

Figure 1:
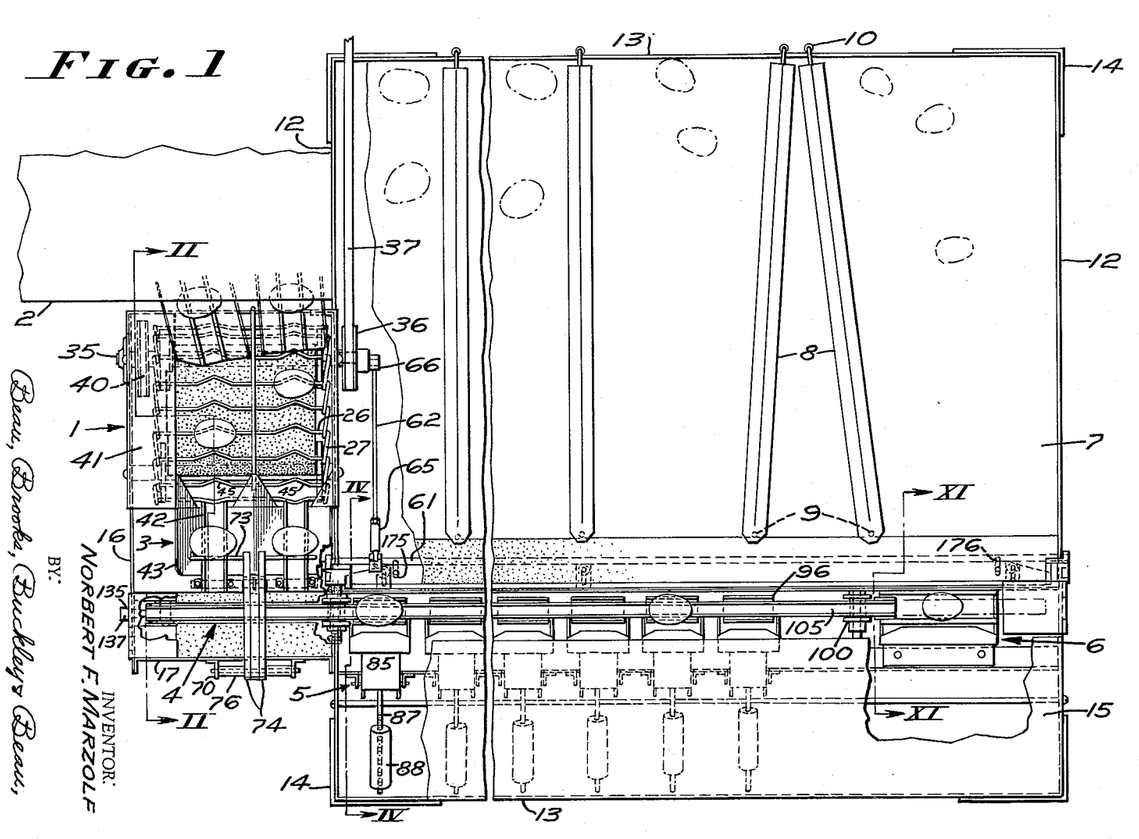
FIG. 1 is a top plan view of an egg grading mechanism constructed in accord with my invention, with parts broken away for ease of illustration and for greater clarity.

In a general way, as shown in FIG. 1, an egg grading machine of my invention comprises a transfer mechanism, generally designated 1, for transferring eggs received by hand feeding and/or from a machine, indicated at 2, such as for example an egg washing machine as set forth in my sending application Serial No. 264,541, filed January 2, 1952, and now Patent 2,824,318, dated February 25, 1958, to a feed mechanism, generally designated 3, positioned adjacent one end of a main conveyor mechanism, generally designated 4. Main conveyor 4 is arranged to transfer the eggs to a series of weighing scales, generally designated 5, and to an end platform, generally designated 6. When the eggs overbalance the scales they are displaced therefrom, by means to be described, onto an egg receiving tray 7 which can conveniently be divided by movable dividers 8 pivotally connected to the mechanism at one end, as at 9, and having a friction fit against a side of the mechanism at their opposite end, as indicated at 10. The tray is thereby divided into individual areas for the different grades of eggs, and the dividers can be moved to vary the relative size of the different areas.

In the illustrated embodiment, the machine is designed to grade two runs of eggs simultaneously.

The machine can conveniently comprise a framework formed in a manner known to the art and having opposite side walls 12 and front and rear end walls 13, with legs which can comprise for example angle brackets 14 at the four corners. This main housing contains the scales 5 and the egg receiving tray 7, and it will be noted that the tray 7 is adapted to rest in the upper portion of the framework, with the rear portion of the scales being covered as by a top plate 15.

Figure 2:
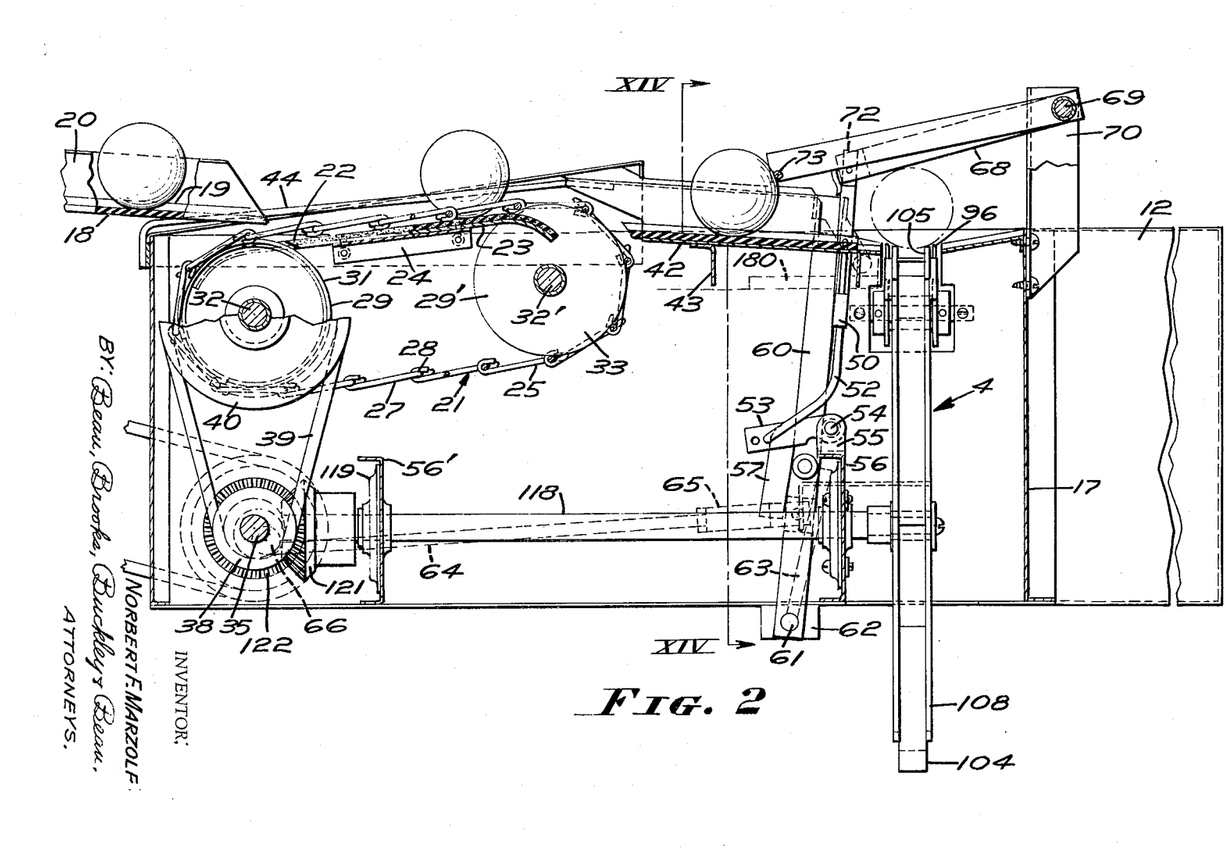
FIG. 2 is a sectional view thereof taken about on lines II—II of FIG. 1, with parts broken away for ease of illustration and to show certain details with greater clarity.

The transfer mechanism 1 (FIGS. 1 and 2) is positioned to one side of this main housing and comprises a housing having opposite side plates 16 and end plates 17 welded and/or otherwise secured to each other and to the main housing in any manner as might be desired and known in the art. First egg track and guide means 18, comprising generally channel-like rubber tracks 19 and diverging side walls 20 are positioned at the inlet end of the transfer mechanism, being carried for example by the egg washing machine 2 for receiving eggs therefrom and directing them onto the transfer mechanism which comprises an endless chain, generally designated 21, adapted to move the eggs across a friction surface comprising a layer of rubber or other friction producing material 22 carried on a suitable backing 23, such as a metal plate, fixed in position as by brackets 24 mounted on the opposite side walls 16 of the transfer housing. Chain 21 comprises a series of interlocked links 25 which are of generally U-shape having an elongated bight portion 26 intermediate opposite side legs 27, each link being conveniently formed of wire stock with the opposite side legs 27 thereof being looped around the juncture between the side legs 27 and bight 26 of an adjacent link, as indicated at 28 (FIG. 2). Thus, each link is pivotally connected to the links on opposite sides thereof to comprise an endless conveyor chain trained around paired drive drums 29 and idler drums 29' (FIG. 2). Each drum 29, 29' has a covering 31 of rubber or other friction producing material which engages the chain 21 for moving the same, the drums 29, 29' being mounted on shafts 32, 32', respectively journalled on the opposite side walls 16 and having opposite sides 33 of slightly greater diameter than the main body part receiving the chain, to maintain the same in position thereon.

The drive drum 29 is itself driven from a main drive shaft 35 journaled in the opposite side walls 16 of the transfer housing and carrying at one end a pulley 36 driven as by a belt 37 from a suitable drive motor (not illustrated) which, when the grader is used in combination with a washer, can comprise the motor used to drive the washer. The main pulley 36 is conveniently located within the main housing, below the egg receiving tray 7, and shaft 35 can carry at its opposite end a pulley 38 which drives a belt 39 training around a pulley 40 connected on the shaft 32 of the drive spools 29. Thus, the drive spools 29 are driven in this manner, and it will be noted that this side part of the transfer housing can be closed, as by a cover 41.

The friction surface 22 extends from a point below the tracks 18 to a point adjacent idler spools 29', being curved downwardly at its opposite ends (see FIG. 2) to accommodate, at one end, the chain 21 as it trains around drive spools 29, and to permit, at its opposite end, eggs to roll downwardly to the level of egg guide tracks 42 which are of a construction similar to the tracks 18 and mounted as by brackets 43 on the machine frame. In this case, the two tracks 42 have a common member 43' forming the diverging walls thereof, and a dividing rod or wire 44 extends rearwardly therefrom, to the end wall 17 adjacent washer 2, to keep the two runs of eggs separate as they are carried by the transfer mechanism.

Thus, the eggs roll from the first feed tracks 18 onto the transfer mechanism friction surface 22, and are rolled therealong by the bight portions 26 of the conveyor chain until the eggs reach the feed tracks 42. It is a particular feature of this portion of my invention that the transfer chain bight portions 26 are formed intermediate their ends to provide generally V-shaped recesses 45 (FIG. 1), whereby these recesses will cradle the eggs and, in conjunction with the friction surface 22, aline the eggs with their long axis extending transversely of the transfer mechanism, to properly align the eggs for the feed tracks 42 and conveyor 4. Indeed, the mechanism is so designed that the eggs must be moved slightly upwardly along the surface 22 and onto the feed tracks 42, as shown in FIG. 2, to further assist in properly aligning the eggs for rolling onto the main conveyor 4.

Figures 3, 11, 12, 13:
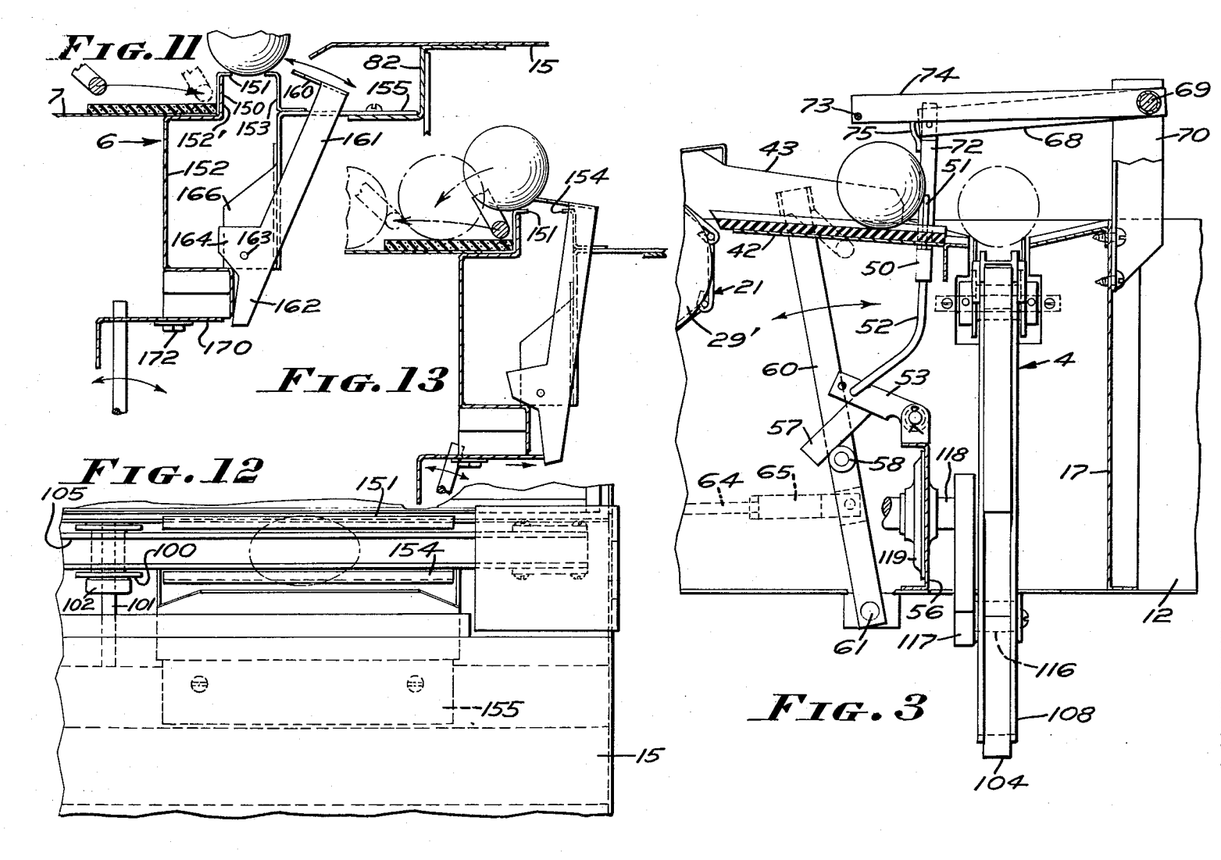
FIG. 3 is a fragmentary view similar to FIG. 2, but showing the feed control mechanism in its alternate position.
FIG. 11 is a sectional view taken about on line XI—XI of FIG. 1.
FIG. 12 is a fragmentary plan view thereof.
FIG. 13 is a view similar to FIG. 11, but showing the displacing member and clearing bar in the position corresponding to that shown in FIG. 5.

The feed mechanism 3, as shown in FIGS. 1, 2, 3 and 14, comprises a gate 50 in the form of a comb, having a series of teeth 51 which are adapted to project through suitable openings in the feed tracks 42 for movement from the position of FIG. 2, wherein the teeth are below the path of movement of eggs on the feed tracks 42, to the position illustrated in FIG. 3 wherein they project upwardly into such path to act as a stop, preventing rolling of the eggs from tracks 42 onto the main conveyor 4.

Gate 50 is mounted at one end on a depending link 52 having an offset lower end pivotally connected to a link 53 which is in turn connected to a shaft 54 journalled on spaced bearing members 55 mounted on a generally channel shaped plate 56 secured to the framework of the transfer mechanism. Shaft 54, at its other end, is fixed to a generally right angle link 57 adapted to bear against a pin 58 carried by one clearing bar lever 60. Lever 60 is pivoted at its lower end to a cross shaft 61 journalled in bearing members 62 depending from the main housing, as clearly illustrated in FIG. 14, and a link 63 is fixed to shaft 61 for rotation therewith. A connecting rod 64, having a length adjustable connection 65 to the link 63, is connected at its opposite end to an eccentric 66 (FIGS. 1 and 2) driven by rotation of the main drive shaft 35 of the machine.

Thus, reciprocation of the connecting rod 64 causes oscillation of the cross shaft 61 which oscillates the clearing bar lever 60 which in turns moves the angle arm 57 to rotate the shaft 54 and thereby alternately raise and lower gate 50. The gate is guided for substantially vertical movement by means of a link 68 connected at one end to a shaft 69 journaled at its opposite ends on brackets 70 connected to the rear wall 17 of the transfer housing, the link 68 being pivotally connected at its other end to the upper end of an extension 72 of the gate, whereby gate 50 is guided for reciprocation between the positions thereof illustrated in FIGS. 2 and 3.

It is important to prevent succeeding eggs from immediately also rolling on the conveyor 4, because eggs are intended to be fed thereto one at a time from each run of eggs, and therefore I provide means comprising in the illustrated embodiment bumper bars 73 carried at the outer end of levers 74 which parallel the link 68 and normally rest on a bracket or stop 75 projecting laterally from opposite sides thereof. At their other ends, the levers 74 are independently mounted on the shaft 69, and spacing elements 76 are provided between levers 74 and brackets 70 to maintain the various parts in properly spaced relation. When gate 50 is in its raised, blocking position illustrated in FIG. 3, the bracket 75 causes it to lift bumpers 73, which can be cushioned as desired. Then, when gate 50 lowers to permit the first egg of each run, closest to the conveyor 4, to roll from tracks 42 onto conveyor 4, the lowering movement of gate 50 permits the bumpers 73 to lower therewith to the position of FIGS. 1 and 2 wherein the bumpers 73 hold back the succeeding egg of each run.

In this way, the feed mechanism permits only one egg at a time to be fed from each run thereof onto the main conveyor 4, with the independently pivoted levers 74 simply resting on the gate bracket 75 so that if, upon lowering gate 50, there should be an egg positioned immediately below either bumper 73, which egg would otherwise perhaps be damaged thereby, the bumper will simply rest on the egg and will not follow the lowering gate, having a lost motion connection therewith.

The conveyor 4 is adapted to receive eggs from the feed mechanism 3 and to convey them to first weighing means 5 adjusted to be actuated by eggs of a predetermined weight and then, assuming that the eggs are not of that weight, to move them to successive weighing means adjusted for actuation by eggs of progressively lighter weight, those eggs which are sufficiently heavy to actuate the respective scales being displaced therefrom by means to be described onto tray 7 and those eggs which are too light in weight to actuate any of the scales being delivered to an end platform 6, and then displaced therefrom.

The weighing mechanisms are substantially identical with those disclosed in my earlier application Serial No. 391,509, filed November 12, 1953, and now Patent 2,835,386 dated May 20, 1958, for an Egg Grader, and therefore do not require detailed descriptions herein. Suffice it to say that the scales 5 are identical in construction, although adjusted for response to eggs of different weights and inasmuch as the illustrated embodiment of my invention is adapted to simultaneously grade two runs of eggs, the first two scales will be set for eggs of the heaviest weight, the next two scales for eggs of the next heaviest weight, and so forth. Each scale, as shown in FIGS. 4, 5, 19 and 20, comprises a bracket 80 mounted on cross members 81 and 82 secured to the main housing, bracket 80 having adjacent its opposite edges flange portions 83 which mount a fulcrum bar 84 receiving depending ears 85 of a plate forming part of the balance beam, the ears having segmental cut-out portions 86 the apexes of which act as pivot bearings against the associated knife edge of the bar 84.

An elongated, cylindrical member or rod 87 is fixed adjacent one end to the plate 85, and a weight member 88 is threaded onto the other end of the rod and secured in selected position thereon, setting the balance for the desired weight, as by set screw 89. When in its normal position of rest the rods 87 of the various scales rest on a cross bar 91. At its other end, the plate 85 carries spaced upstanding ears 92 which also are provided with segmental cut-out portions forming bearings for the knife edges of a fulcrum bar 93 carried by depending leg portions of a generally inverted U-shaped bracket 94.

A plate 95 extends between brackets 83 and 94, being pivotally secured thereto at its opposite ends, the balance being so arranged that as the balance platform descends it remains substantially level. The balance platform comprises a member 96 of generally U-shape providing upstanding walls 97 adapted to receive eggs thereon. If desired, reinforcing brackets 98 can be secured to the scales between platforms 96 and the platform brackets 94.

The main conveyor 4 is mounted for reciprocation in operative alignment with the scale pans 96. To this end, conveyor 4 is supported by spool type bearings 100 journaled at points spaced lengthwise of the main housing by shafts 101 extending between brackets connected to the machine frame and fixed in position as by a washer 102 (FIG. 12). The conveyor proper comprises a first part in the form of a bar 103 adapted to ride on rollers 100 and thereby support the conveyor, being in the illustrated embodiment a bar of generally rectangular cross-section, as clearly illustrated in FIGS. 8 and 9, and having at one end the generally right angularly directed leg 104. The conveyor 4 also comprises a second part 105 in the form of a generally H-shaped member having depending legs 106 adapted to slip-fit on opposite sides of the member 103 and upwardly projecting legs 107 adapted to support an egg thereon. At one of its ends, member 105 is formed with a right angularly related leg 108 in the form of spaced leg portions on opposite sides of leg 104 of the first part 103.

The parts 103 and 105 are joined at points spaced therealong by plates 110 screwed or otherwise secured to the part 105 to depend therefrom adjacent the opposite ends thereof, plates 110 having inclined cam slots 111 formed at their lower ends with generally horizontal auxiliarly slots 112, each adapted to receive a pin 113 carried by the part 103. In this way, the part 105 is adapted to shift relative to part 103 between the raised, elevated position illustrated in FIG. 6, and the lowered position illustrated in FIG. 7, this being accomplished as follows.

The leg 108 of part 105 is formed with a normally generally vertical, elongated slot 115 adapted to receive the crank pin 116 of a crank arm 117 carried by a shaft 118 for rotation therewith, the shaft 118 being journaled by suitable bearing means 119 in the bracket 56 (FIGS. 2 and 3). Shaft 118 extends along the transfer housing, being journaled adjacent its opposite end in a like bearing 119 carried by an upstanding bracket 56′, and carrying at its opposite end a beveled gear 121. Gear 121 engages another beveled gear 122 carried by the shaft 35 previously referred to, whereby crank arm 117 is caused to rotate, being driven by the shaft 35. With rotation of crank arm 117 crank pin 116 travels up and down in cam slot 115 to reciprocate the conveyor part 105.

The leg 104 also is formed with a cam slot, but with the cam slot thereof divided to provide offset portions 125 and 126 joined by an inclined portion 127.

The cam slot sections 125 and 126 are adapted to be alternately shifted into alignment with the cam slot 115 as the crank pin 116 moves therealong, and as the offset portions 125 and 126 are alternately shifted into alignment with the cam slot 115, the second part 105 is alternately raised and lowered relative to the conveyor part 103.

Figures 6, 7, 8, 9, 10:
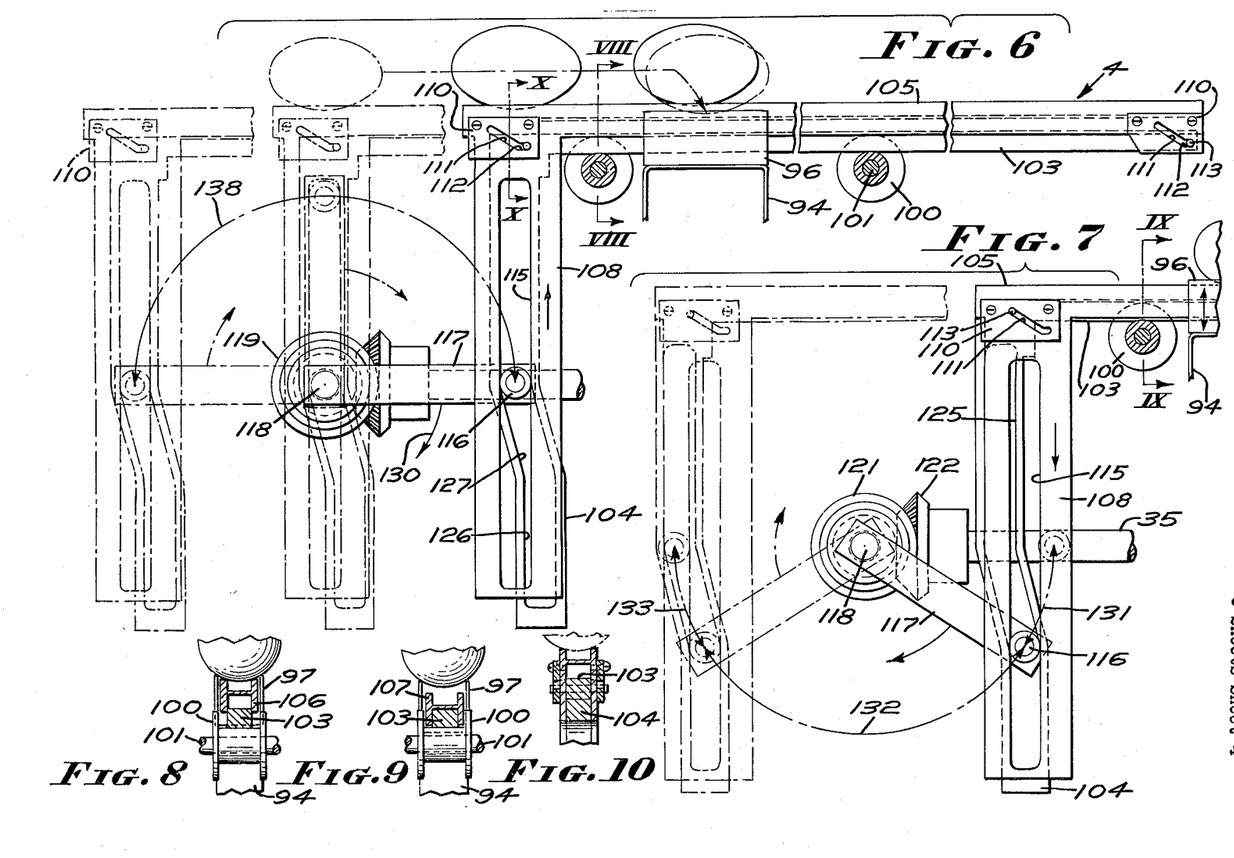
FIG. 6 is a somewhat diagrammatic side elevational view of the main conveyor showing its position at the end of its delivery stroke in full lines, and showing its position at the beginning and midpoint of its delivery stroke in phantom, with parts broken away for ease of illustration.
FIG. 7 is a fragmentary view similar to FIG. 6 further illustrating the operation of the main conveyor.
FIG. 8 is a sectional view taken about on line VIII—VIII of FIG. 6.
FIG. 9 is a sectional view taken about on line IX—IX of FIG. 7.
FIG. 10 is a sectional view taken about on line X—X of FIG. 6.
Figure 14:
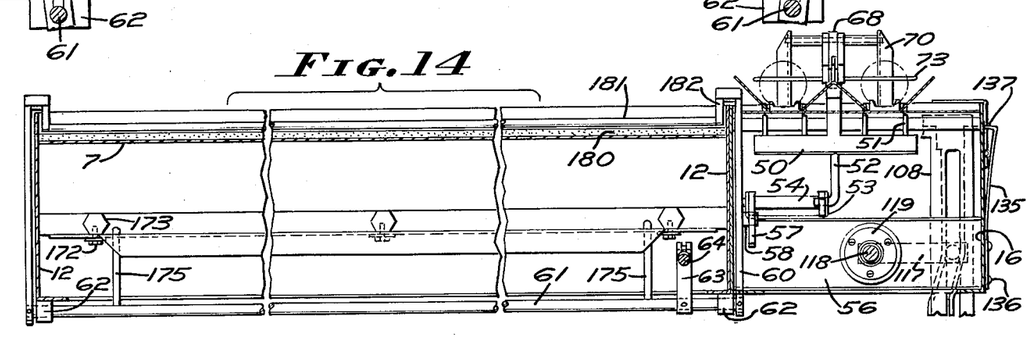
FIG. 14 is a sectional view taken about on line XIV—XIV of FIG. 2, with parts broken away for ease of illustration.
Figure 15:
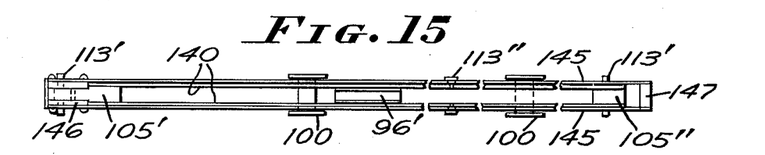
FIG. 15 is a top plan view of a modified form of main conveyor constructed in accord with my invention, parts being broken away for ease of illustration.

Thus, looking now at FIGS. 6–10, the conveyor parts 103 and 105 are shown in full lines in FIG. 6 with the egg carrying part 105 in its raised position, and with the conveyor at the end of its delivery stroke from the transfer and feeding mechanism 1, 3 to the various scale pans 96. It will be seen from FIG. 6 that crank pin 116, which is rotating in a clockwise direction as indicated by the arrow 130, has reached the bottom end of the cam slot 125 and is about to move along the inclined slot portion 127 through arc 131 (FIG. 7). As it does so, the offset cam slot 126 is thereby moved into alignment with the cam slot 115 and the part 103 is shifted relative to part 105, with the pins 113 moving out of the auxiliary slots 112 and permitting the part 105 to move downwardly under the influence of gravity by reason of the inclined slots 111. With this action, eggs carried by the part 105 are transferred automatically to the various scale pans 96, and the conveyor parts 103 and 105 are again arranged for movement in unison through their return stroke.

During the return stroke pin 116 moves through the arc 132 (FIG. 7) with the conveyor 4 moving from the solid line position thereof in FIG. 7 to the position shown therein in phantom.

At that point, with the part 105 still in its down position, the conveyor is positioned to pick up two more eggs from the transfer and feed mechanism, and to pick up eggs too light to actuate the scale pans 96 on which they previously were placed.

This picking up of eggs is accomplished by shifting the part 105 to its elevated position at the end of the return stroke of the conveyor, which occurs as the crank pin 116 swings through the arc 133 (FIG. 7), which is the arc traversed by the crank pin as it moves from the lower end of the inclined slot 127 to the upper end thereof, or from slot 126 to slot 125 to again align the latter with the slot 115. This movement forces the part 105 upwardly, relative to part 103, with the pins 113 shifting down slots 111 and into slot 112.

To assist in lifting the part 105, and to help maintain a smooth action, I provide a spring 135 (FIGS. 1 and 14) shown as being of the leaf type secured at one end to the transfer housing side wall 16, as by rivets 136, and having an inturned end 137 projecting through a suitable opening in the transfer housing side wall for abutting the conveyor part 105 as the conveyor approaches the end of its return stroke, whereby the spring 135 reacts against the swing of crank pin 116 to assist the latter in smoothly lifting the egg carrying part 105.

The conveyor parts then are in the position shown in phantom at the extreme left hand side of FIG. 6, and they remain in this position as the crank pin 116 swings through the arc 138 (FIG. 6), comprising a swing of 180°. This full 180° swing during the delivery stroke is of importance because it means that the part 105 is not lowered, to lower eggs on the scale platforms 96 and the end platform 6, until the conveyor has completely stopped its forward movement, such shifting occurring only at the end of the forward swing of the crank pin 116. Indeed, if anything the conveyor is very slightly retracted as the egg is lowered onto the scale pan, which is of importance because it prevents skidding of the eggs on the scale pan. In the illustrated embodiment the drive crank centers are a total of 1/16″ beyond the scale pan centers.

In other words, if this shifting of conveyor part 105 occurred prior to the complete 180° arc 138 of crank pin 116, at the end of a shorter arc corresponding for example to the return arc 132 shown in FIG. 7, the conveyor would still be moving forwardly as it deposited eggs on the scale pan, with possible damage to the egg and inaccuracy of the weighing process. With the arrangement disclosed the eggs are deposited extremely gently and are accurately positioned. Further, I contemplate a vertical travel for example only 5/16″ for the part 105, thereby minimizing any likelihood of dropping and breaking eggs, with a scale platform travel of for example only 1/8″ for speed and accuracy.

An alternate construction is shown in FIGS. 15–21 wherein, instead of the conveyor reciprocating within a scale platform 96, the conveyor is arranged to reciprocate in alignment with the scale pans, but in such fashion as to straddle scale pans 96′ having upstanding side walls positioned closer to one another than in the case of the scale pans 96. In this embodiment, there can be provided an inner member 105′ having a depending, generally right-angular leg portion 108′ formed with a straight cam slot 115′ therein, the part 105′ having a pair of upstanding plates 140 bolted or otherwise secured thereto on opposite sides thereof, as indicated at 141, the plates 140 being secured at their other ends to a block 105″. A second part 103′ comprises a pair of plates 145 secured at one end to right angularly related leg portion plates 146 and at their other end to a cross block 147, the plates 146 being formed with offset cam slots 125′ and 126′ joined by an intermediate inclined slot 127′. In this embodiment the plates 145 of the part 103′ are adapted to ride on the rollers 100, with the plates 140 of the part 105′ being adapted to carry the eggs, and part 103′ has inclined slots 111′ terminating at their upper ends in generally horizontal slots 112′ which are adapted to receive pins 113′ carried by the part 105′. At their upper ends, plates 146 are secured together as by means of a tie plate 147 and bolts 148. As little as only 1/64″ clearance can be provided between scale platform 96′ and plates 140, on each side thereof.

It is believed that the operation of this embodiment, which is identical with that of FIGS. 6–10, will be obvious without further description, although in this case, to reinforce the plates 140 and 145, I provide auxiliary pins 113″ carried by the plates 140 intermediate the opposite ends thereof and sliding in inclined slots 111″ in plates 145 terminating at their upper ends in generally horizontal slots 112″. Pins 113″ are headed, to hold the plates 140 and 145 closely together in sliding engagement.

As previously noted, each of the inclined slot connections 111, 111′ and 111″ between the conveyor parts terminates at one end in a substantially horizontal, lateral auxiliary slot 112, 112′ and 112″. In the embodiment of FIGS. 6–10 the auxiliary slots are at the bottom of the inclined slots, whereas in the embodiment of FIGS. 15–21 they are at the top. The purpose of the auxiliary slots is to provide a support for the egg carrying parts 105, 105′ when in their raised position.

Figures 16, 17, 18, 19, 20, 21:
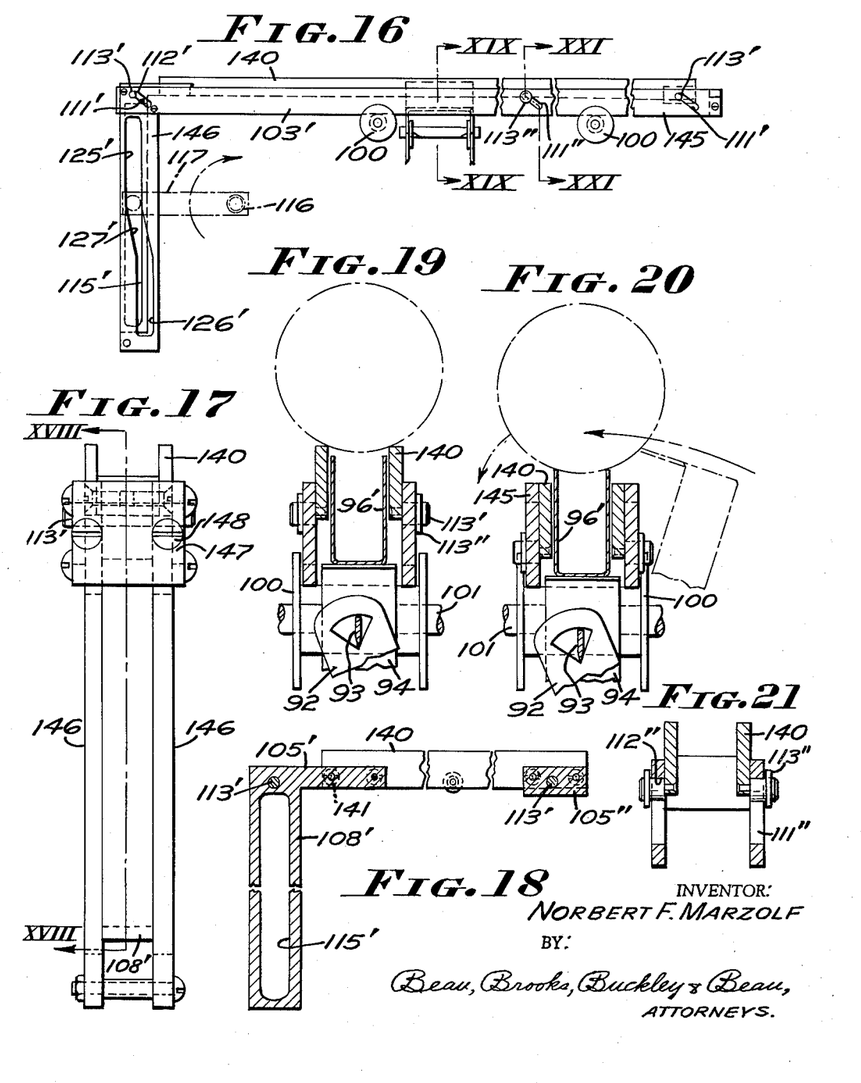
FIG. 16 is a side elevational view thereof.
FIG. 17 is an end elevational view thereof.
FIG. 18 is a sectional view, showing the inner member only, taken about on line VIII—VIII of FIG. 17.
FIG. 19 is a sectional view taken about on line XIX—XIX of FIG. 16.
FIG. 20 is a sectional view taken about on the same line as FIG. 19, but with the parts in an alternate position.
FIG. 21 is a sectional view taken about on line XXI—XXI of FIG. 16.

Thus, as seen in FIG. 6 when the egg carrying part 105 is in an elevated position, its weight is supported by the pin 113 in the lateral slot 112, leaving the crank pin free. In the alternative embodiment the same is true, as clearly indicated in FIG. 16 showing how the elevated part 105′ is supported by the pins 113′ and 113″ in the laterally directed slots 112′ and 112″.

As previously noted, eggs too light to actuate any of the scales 5 are deposited on a fixed end platform 6 (FIGS. 11, 12 and 13) comprising for example the inner edge of tray 7 formed to provide an upwardly directed flange 150 terminating in an inwardly directed flange part 151. The upright flange 150 is reinforced by the upper terminal of a beam 152 of generally hat-shaped cross section extending between the opposite side walls 12 of the main housing. The other part of the platform 6 is provided by a bracket 153 of generally Z-shaped cross section having an inturned flange 154 cooperating with flange 151 to receive an egg thereon, as illustrated in FIG. 11, and being carried by an angle bracket 155 secured to the bracket 82 previously referred to.

The egg displacing members comprise pusher plates 160 of generally flat, horizontal extent having depending legs 161 at opposite sides thereof, which legs are pivoted closely adjacent their lower ends 162 to the scale pan bracket 94, as indicated at 163. It will be observed that the legs 161 are enlarged, as at 164, with the pivot points 163 being off center so that normally the displacing members occupy the position illustrated in FIG. 4, while being pivotable about point 163 to cause the plate 160 to swing across the scale pan to the position shown in FIG. 5. The fixed platform 6 is similarly provided with an article displacing member, with the legs 161 thereof being pivoted to corner angle brackets 166 carried by the bracket 155.

Figure 4:
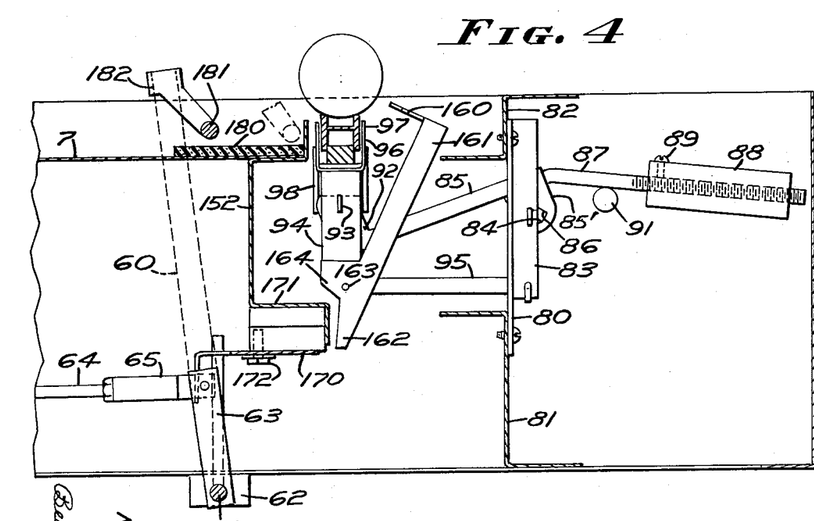
FIG. 4 is a sectional view taken about on line IV—IV of FIG. 1, showing an egg displacing member and the clearing bar in one position thereof.
Figure 5:
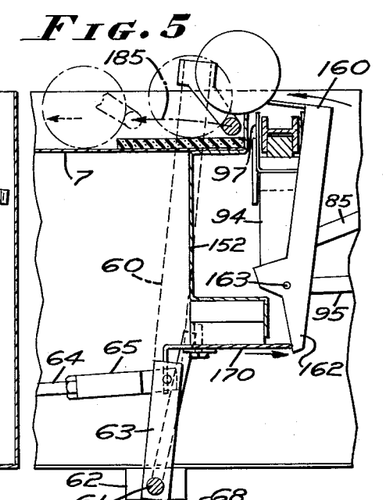
FIG. 5 is a fragmentary view similar to FIG. 4 but showing the displacing member and clearing bar in another position thereof.

To actuate the various displacing members I provide a generally angle shaped actuating member 170 secured to the underside of the bottom horizontal flange 171 of bracket 152, as by bolts 172 engaging mounting members 173, the member 170 being mounted for reciprocating movement from the position illustrated in FIG. 4, wherein the forward edge of the plate 170 is positioned within the confines of bracket 152 to the position illustrated in FIG. 5 wherein it projects therebeyond. The scale pan displacing member leg ends 162 normally are positioned clear of this path of movement of the actuating member 170, as illustrated in FIG. 4, but whenever the scale pan descends under the weight of an egg it carries with it the displacing member 160 to cause the lower end 162 thereof to project into the path of movement of the plate 170, whereby the latter then engages the ends 162 to pivot the displacing member 160 about its pivots 163 and thereby displace an egg from the scale platform onto the tray 7, as illustrated in FIG. 5. Therefore, as the plate 170 reciprocates it will actuate the displacing member 160 of any scale carrying an egg of sufficient weight to cause it to descend, and in the case of the end platform 6 it will be noted from FIGS. 11 and 13 that the displacing member 160 thereof is so positioned that its lower end 162 always projects into the path of plate 170, for being actuated thereby to displace an egg from the platform with every forward stroke of the member 170.

For reciprocating the member 170 in synchronism with the other parts of the grader, I provide means in the form of drive arms or pins 175 carried by the cross rods 61 for oscillation thereby, the pins 175 engaging in openings 176 in the actuating member 170 (FIG. 1).

In this way, eggs are displaced from the various scale and end platforms, and I provide cushioning means 180 in the form of sponge rubber or like material to receive the eggs as they are displaced from the platform onto the tray, as clearly illustrated in FIG. 5.

To move the eggs along the receiving tray 7 so that they are not struck by eggs subsequently displaced immediately therebehind, I provide a clearing bar 181 carried by brackets 182 secured to arms 60, previously referred to, which are fixed to the cross rod 61 at opposite sides of the main housing. In this way, the clearing bar 181 is oscillated between the position thereof shown in FIG. 5, wherein it is closely adjacent the upstanding flange 152′ of bracket 152 so that displaced eggs will roll thereover, and the position thereof shown in FIG. 4. During forward movement of bar 181, in the direction of the arrow 185 in FIG. 5, it will push any displaced eggs in front of it along the tray 7 and away from the various platforms.

It is believed that the operation of the egg grading machine of my invention is clearly apparent from the foregoing description of the various component parts thereof. By way of summary, it is seen that the transfer conveyor chain 21 constantly receives eggs from the washer 2 or from the initial feed station, as the case may be, and delivers them to the feeding mechanism 3. This mechanism is driven in synchronism with the conveyor 4, so that each time the conveyor 4 moves through its return stroke, to the position illustrated in phantom at the extreme left of FIG. 7, gate 50 lowers to permit the first egg on each track 42 to roll onto the conveyor 4 while the bumper 73 lowers with it to prevent subsequent eggs from rolling along the tracks 42 onto the conveyor. The conveyor then moves from the position illustrated in phantom at the left in FIG. 6 to the position illustrated therein in full lines, following which the egg carrying part descends to the position illustrated in full lines in FIG. 7 depositing eggs on the various scale pans and end platform. The conveyor mechanism then is returned, with the egg carrying part lowered, to repeat the process.

In the meantime, the actuating member 170 is driven in synchronism with the main conveyor 4, so that subsequent to deposit of the eggs on the scale pans and end platform, and prior to elevation of the egg carrying part of the conveyor at the end of its return stroke, member 170 moves forwardly to its projected position in FIG. 5, to cause the displacing members 160 to displace eggs only from those scale pans which have lowered, and in each instance from the end platform 6. Then, member 170 is retracted or returned and while the conveyor delivers a new set of eggs to the scale pan, and transfers eggs from one set of pans to succeeding pans, the clearing bar 181 is swung from its position in FIG. 5 to that of FIG. 4 to clear any eggs from the tray immediately adjacent the weighing section.

Accordingly, it is seen that my invention fully accomplishes its intended objects, and while I have disclosed and described in detail only one embodiment thereof, with a modification of the conveyor assembly, I do not thereby intend that my inventon be limited to such details. Instead, I realize that various modifications and variations will readily occur to those skilled in the art without departing from the spirit of my invention and the scope of the appended claims.

Having fully disclosed and completely described my invention, together with its mode of operation, what I claim as new is:

1. In a machine for grading articles according to weight, a series of weighing means having article receiving platforms alined in a row, article conveying means for conveying articles to a first one of said platforms and then to succeeding ones thereof, said article conveying means comprising carriage means, support means mounting said carriage means for reciprocating movement through a delivery stroke and a return stroke in operative alinement with said platforms, said carriage means having a first part carried by said support means and a second part carried by said first part, said first and second parts being movable in unison and said second part being movable relative to said first part between raised and lowered positions relative thereto, and drive means connected to said carriage means for reciprocating the same through said delivery and return strokes, said drive means including means moving said first and second parts in unison throughout the entire delivery stroke and the major portion of the return stroke and moving said first and second parts relative to one another at the beginning and end of said return stroke, together with means translating such relative motion into shifting of said second part to its raised position at the end of the carriage return stroke and to its lowered position at the beginning of the carriage return stroke, said second part having article supporting means arranged so that when said second part is in its raised position articles thereon are supported at an elevation above said platforms and when said second part is in its lowered position it clears articles on said platforms, said second part being moved to its lowered position to deposit articles on said platforms only after completion of the carriage delivery stroke.

2. In a machine for grading articles according to weight, a series of weighing means having article receiving platforms alined in a row, article conveying means for conveying articles to a first one of said platforms and then to succeeding ones thereof, said article conveying means comprising carriage means, support means mounting said carriage means for reciprocating movement in operative alinement with said platforms, said carriage means having a first part carried by said support means and a second part carried by said first part, said first and second parts being movable in unison and said second part being movable relative to said first part between raised and lowered positions relative thereto, and drive means connected to said carriage means for reciprocating the same through a delivery stroke and a return stroke, said drive means including means for moving said first and second parts in unison throughout the entire delivery stroke and the major portion of the return stroke and relative to each other at the beginning and end of the return stroke, and means translating such relative motion into movement of said second part to its raised position at the end of the carriage return stroke and to its lowered position at the beginning of the carriage return stroke, said second part having article supporting means arranged so that when said second part is in its raised position articles thereon are supported at an elevation above said platforms and when said second part is in its lowered position it clears articles on said platforms, wherein said first and second parts each comprise a pair of generally parallel plate members, pin means carried by certain ones of said plate members, and inclined slot means carried by the other of said members, said slot means receiving said pin means and accommodating raising and lowering of said second part, and said pin means being headed to secure together adjacent ones of said plate members and thereby reinforce said carriage means.

3. An article grading mechanism as set forth in claim 1, wherein said drive means comprise a rotary drive member, and means converting the rotation of said drive member into reciprocation of said carriage means, said last-named means including means producing relative motion between said first and second parts at the beginning and end of the carriage return stroke.

4. In a machine for grading articles according to weight, a series of weighing means having article receiving platforms alined in a row, article conveying means for conveying articles to a first one of said platforms and then to succeeding ones thereof, said article conveying means comprising carriage means, support means mounting said carriage means for reciprocating movement in operative alinement with said platforms, said carriage means having a first part carried by said support means and a second part carried by said first part, said first and second parts being movable in unison and said second part being movable relative to said first part between raised and lowered positions relative thereto, and drive means connected to said carriage means for reciprocating the same through said delivery and return strokes, said second part having article supporting means arranged so that when said second part is in its raised position articles thereon are supported at an elevation above said platforms and when said second part is in its lowered position it clears articles on said platforms, wherein said drive means comprise a rotary drive member, crank means operatively connected to said rotary drive member, first and second cam means operatively connected to said first and second carriage parts, each of said first and second cam means having a cam slot therein, said crank means having crank pin means engaged in said cam slots, the cam slot of one of said cam means being formed to cause said first and second carriage parts to move in unison throughout the entire delivery stroke and the major portion of the return stroke and relative to one another at the beginning and end of the return stroke, and cam means converting such relative motion into alternate raising and lowering of said second carriage part relative to said first carriage part.

5. An article grading mechanism as set forth in claim 4, wherein said last named cam means comprises, pin means operatively connected to one of said first and second carriage parts and inclined slot means operatively connected to the other thereof, said pin means engaging in said inclined slot means.

6. In a mechanism for grading articles according to weight, a series of weighing means having article receiving platforms alined in a row, article conveying means for conveying articles to a first one of said platforms and then to succeeding ones thereof, said article conveying means comprising carriage means, support means mounting said carriage means for rectilinear reciprocating movement in operative alinement with said platforms, said carriage means having a first part carried by said support means and a second part carried by said first part, said first and second parts being movable in unison and said second part being movable relative to said first part between raised and lowered positions relative thereto, said second part having article supporting means arranged so that when said second part is in its raised position articles thereon are supported at an elevation above said platforms and when said second part is in its lowered position it clears articles on said platforms, and drive means connected to said carriage means for moving the same through a delivery stroke and a return stroke, said drive means including means moving said first and second parts relative to one another after the conclusion of said delivery stroke and at the end of said return stroke and in unison at all other times, and means automatically responsive to such relative motion for moving said second part to its raised position at the end of the carriage return stroke and to its lowered position after the conclusion of the carriage delivery stroke.

7. In a mechanism for grading articles according to weight, a series of weighing means having article receiving platforms alined in a row, article conveying means for conveying articles to a first one of said platforms and then to succeeding ones thereof, said article conveying means comprising carriage means, support means mounting said carriage means for reciprocating movement in operative alinement with said platforms, said carriage means having a first part carried by said support means and a second part carried by said first part, said first and second parts being movable in unison and said second part being movable relative to said first part between raised and lowered positions relative thereto, said second part having article supporting means arranged so that when said second part is in its raised position articles thereon are supported at an elevation above said platforms and when said second part is in its lowered position it clears articles on said platforms, and drive means connected to said carriage means for reciprocating the same through a delivery stroke and a return stroke, said drive means moving said first and second parts in unison throughout the entire delivery stroke and the major portion of the return stroke and relative to each other at the beginning and end of said return stroke, and means translating such relative motion into movement of said second part to its raised position at the end of the carriage return stroke and to its lowered position at the beginning of the carriage return stroke, wherein said last-named means includes inclined slot means operatively connected to one of said first and second parts and pin means operatively connected to the other of said first and second parts and engaging in said slot means.

8. A mechanism as set forth in claim 7, together with normally generally horizontal auxiliary slot means extending from said inclined slot means to receive said pin means for supporting said second part thereon when the latter is in its raised position.

9. A mechanism as set forth in claim 7, together with spring means abutting said second part at the end of the carriage return stroke to help said drive means move said second part to its raised position.

10. In a mechanism for grading articles by weight, weighing means having an article receiving platform movable between first and second positions, means biasing said platform to said first position for movement therefrom to said second position only when an article exceeding a predetermined weight is placed on said platform, article receiving means adjacent said platform, means for displacing an article of excess weight from said platform onto said article receiving means including a member operatively connected to said platform for movement therewith from said first position to said second position, said member normally being out of article engaging position and being movable to engage and displace an article on said platform, means for conveying an article to be graded to said platform and for conveying an underweight article therefrom, and means for moving said member to displace an article from said platform, said last-named means including an actuating member mounted for movement in a predetermined path, said displacing member being out of said path when said platform is in said first position and projecting into said path for movement by said actuating member to displace an article from said platform when said platform is in said second position, and means synchronized with said conveying means moving said actuating member through said path each time an article is conveyed to said platform thereby to actuate said displacing member whenever said platform is in said second position to displace an article therefrom.

11. In a mechanism for grading articles according to weight, a series of weighing means having first article receiving platforms alined in a row, a second article receiving platform at one end of said row of first platforms, means for conveying articles to be graded first to a first platform adjacent the opposite end of said row and then to successive ones of said first platforms and finally to said second platform, article receiving means adjacent said row of first and second platforms, means normally biasing said first platforms to a first position for receiving articles while enabling movement thereof to a second position by an article of sufficient weight, said second platform being fixed in one position, first displacing means operatively connected to said first platforms for movement therewith, second displacing means operatively associated with said second platform, said first and second displacing means normally being out of article engaging position and being movable to engage and displace articles from said platform, and actuating means common to said first and second displacing means movable in a predetermined path, said first displacing means projecting into said path for being actuated by said actuating means only when the first platform associated therewith is in said second position, said second displacing means always projecting into said path for being actuated by said actuating means, and means synchronized with said conveying means for moving said actuating means through said path with each delivery of articles to said platforms by said conveying means.

12. In a mechanism for grading articles by weight, weighing means having an article receiving platform movable between first and second positions, means biasing said platform to said first position for movement therefrom to said second position only when an article exceeding a predetermined weight is placed on said platform, article receiving means adjacent said platform, means for displacing an article from said platform onto said article receiving means including a member operatively connected to said platform for movement therewith from said first position to said second position, said member normally being out of article engaging position, means for conveying an article to be graded to said platform and for conveying an underweight article therefrom, and means for moving said member to displace an article from said platform, said last-named means including an actuating member mounted for movement in a predetermined path, said displacing member being out of said path when said platform is in said first position and projecting into said path when said platform is in said second position, and means synchronized with movement of said conveying means for moving said actuating member to actuate said displacing member whenever said platform is in said second position to displace an article therefrom, together with a clearing bar positioned close to said article receiving means and mounted for movement over a part thereof to and from a position closely adjacent said platform enabling passage of a displaced article thereover, and means synchronized with movement of said actuating and displacing means for so moving said clearing bar.

13. A mechanism for grading articles according to weight comprising, a weighing scale having an article receiving platform, a tray adjacent said platform for receiving articles displaced therefrom, means for conveying an article to said platform and for removing an underweight article therefrom, means automatically operable to cause an article of sufficient weight to be displaced from said platform onto said tray, a clearing bar mounted closely adjacent said tray for movement over a part thereof into and out of a position closely adjacent said platform, said clearing bar when in said position enabling passage thereover of an article being displaced from said platform and serving when moving out of said position to move such displaced articles along said tray away from said platform, and means synchronized with said article displacing means for so moving said clearing bar.

14. In a mechanism for grading articles according to weight, a transfer mechanism for transferring articles from an inlet feed track to a feed control assembly, said transfer mechanism comprising a friction-producing surface extending between said inlet feed track and said feed control assembly, a series of generally U-shaped links each having a bight portion and opposite side leg, the opposite ends of each link being pivotally connected to the adjacent link at the juncture between the legs and bight portion thereof to comprise an endless chain, said side legs spacing apart said bight portions a distance sufficient to accommodate an article therebetween in contact with said friction surface and means mounting said chain for movement of the article conveying flight thereof over said friction surface between said inlet feed tract and said feed control assembly including drive drum means having a covering of friction-producing material engaging said endless chain for moving the same whereby articles will be rolled along said friction surface by said chain link bight portions.

References Cited in the file of this patent

UNITED STATES PATENTS

| | | |
|---|---|---|
| 1,256,182 | Splittstoser | Feb. 12, 1918 |
| 2,122,200 | Fourment | June 28, 1938 |
| 2,160,319 | Swartz | May 30, 1939 |
| 2,246,597 | Niederer et al. | June 24, 1941 |
| 2,381,035 | Campbell et al. | Aug. 7, 1945 |
| 2,479,709 | Arnold | Aug. 23, 1949 |
| 2,517,341 | Page | Aug. 1, 1950 |
| 2,646,168 | Niederer et al. | July 21, 1953 |
| 2,687,802 | Davis | Aug. 31, 1954 |
| 2,722,406 | Kurek | Nov. 1, 1955 |
| 2,796,967 | Myer | June 25, 1957 |
| 2,818,173 | Powell | Dec. 31, 1957 |

FOREIGN PATENTS

| | | |
|---|---|---|
| 763,808 | France | Feb. 19, 1934 |